United States Patent [19]

Sawanobori

[11] Patent Number: 5,793,923
[45] Date of Patent: Aug. 11, 1998

[54] DEVICE FOR CONTROLLING NUMBER OF PIXELS

[75] Inventor: Keiji Sawanobori, Tokyo, Japan

[73] Assignee: Asahi Kogaku Kogyo Kabushiki Kaisha, Tokyo, Japan

[21] Appl. No.: 710,543

[22] Filed: Sep. 19, 1996

[30] Foreign Application Priority Data

Sep. 21, 1995 [JP] Japan .................................. 7-266209

[51] Int. Cl.⁶ ........................ H04N 5/76; H04N 5/225
[52] U.S. Cl. ......................... 386/46; 386/117; 386/121; 358/909.1
[58] Field of Search ........................... 386/46, 117, 120, 386/38, 121; 358/906, 909.1; 348/230–233, 333; H04N 5/76, 5/225

[56] References Cited

U.S. PATENT DOCUMENTS

4,928,137   5/1990   Kinoshita ............................ 358/906
5,327,264   7/1994   Iyama ................................. 386/1

Primary Examiner—Thai Tran
Attorney, Agent, or Firm—Greenblum & Bernstein, P.L.C.

[57] ABSTRACT

The pixel number control device has a correlated double sampling (CDS) circuit by which the number of pixel signals outputted from a CCD are controlled. In the record mode, in which a still image corresponding to the pixel signals is recorded in a recording medium, all of the pixel signals are outputted from the CDS circuit. In the monitor-through mode in which a moving image corresponding to the pixel signals obtained by the CCD is indicated by a liquid crystal display, a part of the pixel signals is subsampled and is not outputted from the CDS circuit.

5 Claims, 5 Drawing Sheets

| Mg | G | Mg | G | Mg | G | Mg | --- |
| Ye | Cy | Ye | Cy | Ye | Cy | Ye | --- |
| G | Mg | G | Mg | G | Mg | G | --- |
| Ye | Cy | Ye | Cy | Ye | Cy | Ye | --- |
| Mg | G | Mg | G | Mg | G | Mg | --- |
| : | : | : | : | : | : | : | |

C1 encloses Mg, G, Ye, Cy (top-left 2x2). 41 labels the array.

FIG. 3

OUTPUT vs BANDWIDTH, with B1 and B2 indicated.

FIG. 4

| J1 | | J2 | | J1 | | J2 | | |
|---|---|---|---|---|---|---|---|---|
| Mg1 | G1 | Mg2 | G2 | Mg3 | G3 | Mg4 | G4 | --- ← H1 |
| Ye1 | Cy1 | Ye2 | Cy2 | Ye3 | Cy3 | Ye4 | Cy4 | --- ← H2 |
| K1 | | K2 | | K1 | | K2 | | |

| R | G | B | R | G | B | --- |
|---|---|---|---|---|---|---|
| R | G | B | R | G | B | --- |
| R | G | B | R | G | B | --- |
| R | G | B | R | G | B | --- |
| R | G | B | R | G | B | --- |
| ⋮ | ⋮ | ⋮ | ⋮ | ⋮ | ⋮ | |

DEVICE FOR CONTROLLING NUMBER OF PIXELS

BACKGROUND OF THE INVENTION

1. Field of the Invention

The present invention relates to an electronic still camera having a display device indicating a moving image which is obtained through an imaging device.

2. Description of the Related Art

Conventionally, there is known an electronic still camera having a display device used as a view-finder. The display device has a liquid crystal display, for example, on which a moving image obtained through an imaging device can be indicated in a real-time mode. Namely, the photographer can determine a timing of the shutter release by observing an image indicated on the liquid crystal display, and thus, a desired still image can be recorded in a recording medium.

The conventional display device, however, is constructed in such a manner that pixel signals outputted from the imaging device are subjected to a predetermined signal process to indicate a moving image, and a number of pixels of one frame of the moving image is the same as that of the still image recorded in the recording medium. Accordingly, the electronic still camera has an electric power consumption requirement, for indicating the moving image on the display device, which is equal to that for recording the still image in the recording medium. This causes the life of a battery, which is an electric power source of the electronic still camera, to become short.

SUMMARY OF THE INVENTION

Therefore, an object of the invention is to provide a control device by which a power consumption requirement, for indicating a moving image on a display device used as a viewfinder, is reduced.

According to the present invention, there is provided a device for controlling a number of pixels, the device being provided in an electronic still camera which has an imaging device that outputs real-time pixel signals and a display device indicating a moving image corresponding to the pixel signals outputted in real-time from the imaging device, the control device comprising a control circuit by which a number of pixels in one frame of each of the still image and the moving image is controlled in such a manner that the number of pixels of one frame of the moving image is less than that of the still image.

Further, according to the present invention, there is provided a device for controlling a number of pixels of a still image recorded in a recording medium and a moving image indicated by a display device, respectively, the still image being included in the moving image, the device comprising outputting means and control means. The output means outputs a pulse signal which pixel signals corresponding to the still image and moving image are transmitted in synchronization to the recording medium and the display device, respectively. The control means controls the output means in such a manner that a number of pixels included in one frame of the moving image is less than that of the still image.

Furthermore, according to the present invention, there is provided a monitor control device provided in an electronic still camera in which pixel signals outputted from an imaging device can be recorded in a recording medium as a still image, the device comprising indicating means and control means. The indicating means indicates the pixel signals on a display surface in a monitor-through mode in which a moving image is indicated. The control means controls a number of pixels in one frame of each of the still image and the moving image. The control means reduces the number of pixels in the monitor-through mode in comparison with that of pixels in a mode in which the pixel signals are recorded in the recording medium.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will be described below with reference to embodiments shown in the drawings.

Figure 1:
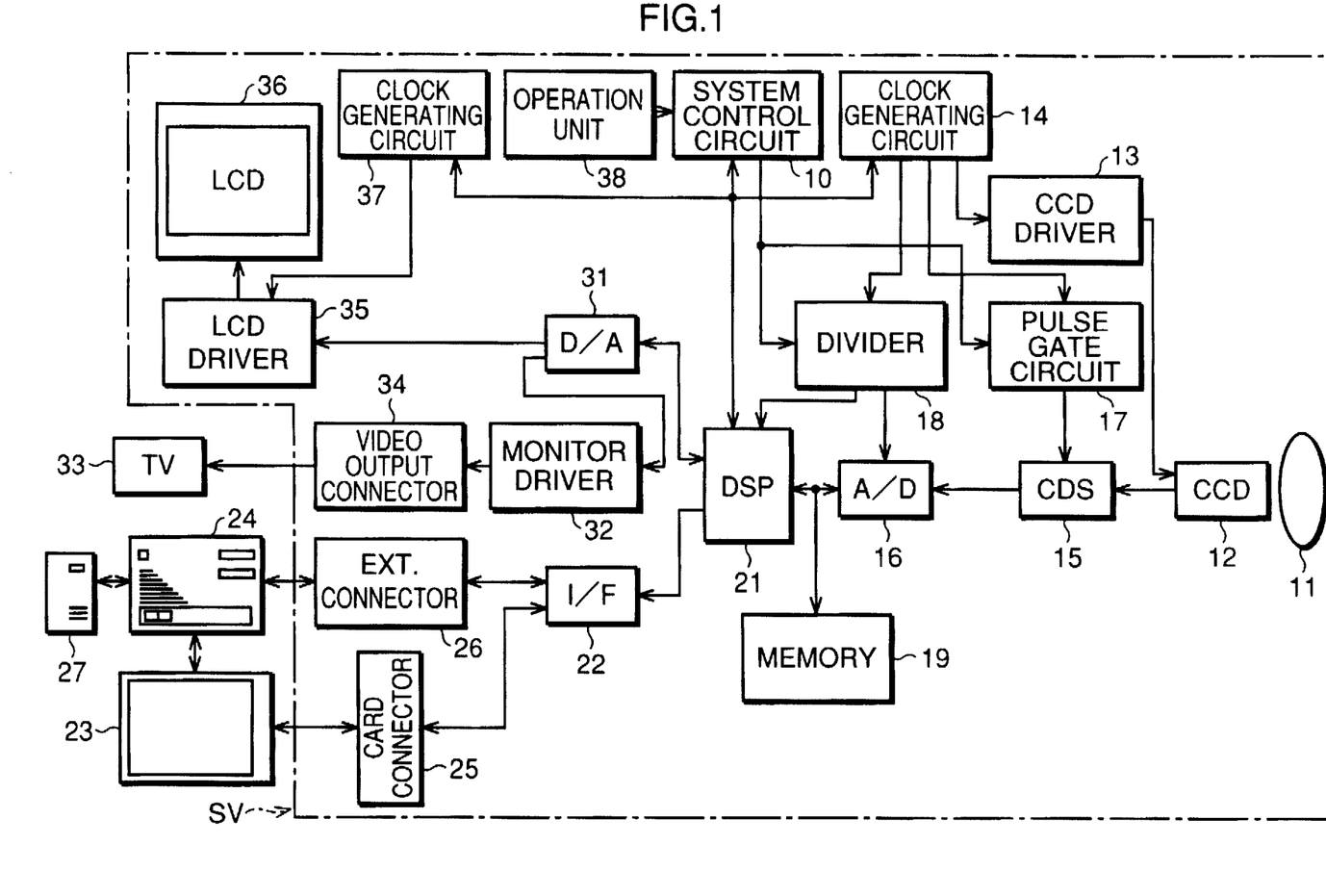
FIG. 1 is a block diagram showing an electronic still camera having a control device of a first embodiment of the present invention.

FIG. 1 is a block diagram showing an electronic still camera having a control device of a first embodiment of the present invention.

A system control circuit 10 is a micro-computer which controls an electronic still camera SV as a whole. The electronic still camera SV can be operated in a monitor-through mode and in a record mode. In the monitor-through mode, a moving image obtained through an imaging device or CCD (charge coupled device) 12 is indicated on an LCD (liquid crystal display) 36 in real-time. In the record mode, a still image included in the moving image is recorded in a recording medium, such as a memory card 23.

Light reflected from a subject (not shown) to be photographed passes through an optical block 11 including a photographing lens, and is transmitted onto a light receiving surface of the CCD 12. Thus, pixel signals corresponding to the subject are generated by photodiodes (not shown) of the CCD 12, the photodiodes forming the light receiving surface. A complementary color filter has filter elements arranged like a checkerboard. Namely, sets of four filter elements, magenta, green, yellow and cyan are grouped together within the checkered arrangement of the light receiving surface, so that pixel signals corresponding to magenta, green, yellow and cyan are outputted from the CCD 12.

The CCD 12 is driven by a CCD driver 13, which is operated based on an original clock signal outputted at a constant period by a first clock generating circuit 14. Namely, the pixel signals are outputted from the CCD 12 and inputted into a correlated double sampling circuit 15, in synchronization with the original clock signal.

In the CDS circuit 15, the pixel signals are subjected to a predetermined signal process, such as removal of reset noise, are sample-held, and are then outputted to an A/D converter 16. Namely, in the CDS circuit 15, the signal process is performed in accordance with a sample-hold (S/H) pulse signal outputted by a pulse gate circuit 17. Due to an operation of the pulse gate circuit 17, in the record mode, the S/H pulse signal is synchronized with the original pulse signal outputted from the clock generating circuit 14, and in the monitor-through mode, the S/H pulse signal is generated by passing only a part of the original pulse signal.

In the A/D converter 16, an A/D conversion is performed in accordance with an A/D clock signal outputted from a divider 18. Due to an operation of the divider 18, in the record mode, the A/D clock signal is synchronized with the original pulse signal outputted from the clock generating circuit 14, and in the monitor-through mode, the S/H pulse signal is generated by dividing the original pulse signal, and has a lower frequency than that of the original pulse signal.

The pixel signals are A/D converted to digital signals in the A/D converter 16, and are stored in an image memory 19, which has a capacity such that one field of pixels signals can be stored.

The digital pixel signals read from the image memory 19 are inputted into a digital video signal processing circuit (DSP) 21, in which a complementary-color to primary-color conversion, a white balance, and a gamma process are applied to the pixel signals, so that primary color signals composed of an R-signal (red), a G-signal (green), and a B-signal (blue) are obtained. The process in the DSP circuit 21 is performed in accordance with a DSP clock signal outputted from the divider 18, and the DSP clock signal is outputted in synchronization with the A/D clock signal.

The primary color signals outputted by the DSP circuit 21 are inputted to an interface (I/F) circuit 22, in which the format of the primary color signals is converted for recording the primary color signals in the memory card 23, or that for a process performed in a computer 24 provided outside the electronic still camera SV. The memory card 23 can be attached to, and detached from, a card connector 25, and the computer 24 can be attached to, and detached from, an external connector 26. Namely, the primary color signals outputted from the I/F circuit 22 are transmitted to the memory card 23 or to the computer 24 through the connectors 25 or 26, respectively. In the record mode, a still image is recorded in the memory card 23, and a signal processed in the computer 24 can be recorded to the memory card 23 or to a hard disk 27.

The primary color signals outputted from the DSP circuit 21 are converted into analogue signals by a D/A converter 31. The analogue primary color signals are converted into signals according to, for example, the NTSC system in a monitor driver 32, and can be outputted through a video output connector 34 to a television set 33 provided outside the electronic still camera SV.

Further, the analogue primary color signals are outputted to the LCD 36 through an LCD driver 35. The LCD 36 is operated in the monitor-through mode, in which a moving image outputted from the CCD 12 is indicated by the LCD 36 in real-time. The LCD driver 35 is operated based on a clock signal outputted at a constant period from a second clock generating circuit 37, so that a moving image having a predetermined image quality is indicated by the LCD 36. Note that a number of dots indicated by the LCD 36 is set such that a spatial frequency of an image which can be indicated by the LCD 36 is lower than the highest spatial frequency of an image which can be obtained by the CCD 12.

The first and second clock generating circuits 14, 37 are operated in accordance with a command signal outputted by the system control circuit 10, to output a clock signal having a predetermined frequency.

An operation unit 38 is connected to the system control circuit 10, and is provided with a release button, and a set switch for setting the monitor-through mode and the record mode. By partly pressing the release button, a photometry measurement and a distance measurement are carried out, and by fully pressing the release button, a recording operation is carried out so that a video signal is recorded in the memory card 23.

Figure 2:
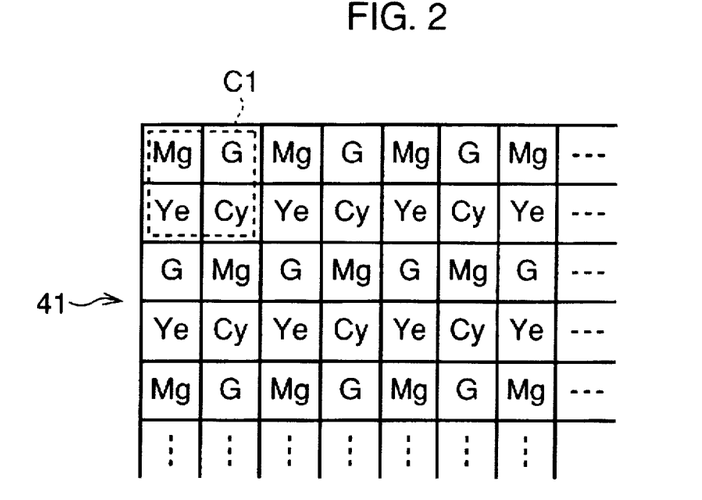
FIG. 2 is a view showing an arrangement of each the color filter elements provided on a light receiving surface of a CCD in the first embodiment.

FIG. 2 shows an arrangement of each of the color filter elements of the complementary color filter 41 provided on the light receiving surface of the CCD 12. In this color filter 41, color filter elements, which allow magenta (Mg), green (G), yellow (Ye), and cyan (Cy) lights to pass are arranged in a regular manner. Namely, as in the four pixels enclosed by a broken line C1, in which two pixels are aligned in a horizontal direction and a vertical direction, respectively. Mg, Ye and Cy filter elements which have different spectral characteristics from each other are provided, in addition to the G filter element.

Figure 3:
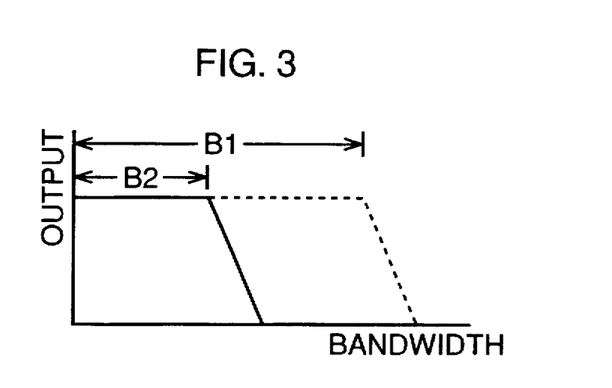
FIG. 3 is a diagram showing a bandwidth of a spatial frequency of an image which is obtained by the CCD and a bandwidth of a spatial frequency of an image which can be indicated by a liquid crystal display.

The pixel signals generated in the CCD 12 are read out therefrom in a so-called two-line parallel reading mode, as described later. All of the pixel signals generated in the CCD 12 are read out therefrom during the record mode, in which a still image is recorded in the memory card 23. Conversely, in the monitor-through mode, in which the LCD 36 is used as a viewfinder, a bandwidth B2 of a spatial frequency of an image which can be indicated by the LCD 36 is equal to half of the bandwidth BI of a spatial frequency of an image obtained by the CCD 12, as shown in FIG. 3. Therefore, approximately one half of the pixel signals outputted from the CCD 12 are subsampled.

Figure 4:
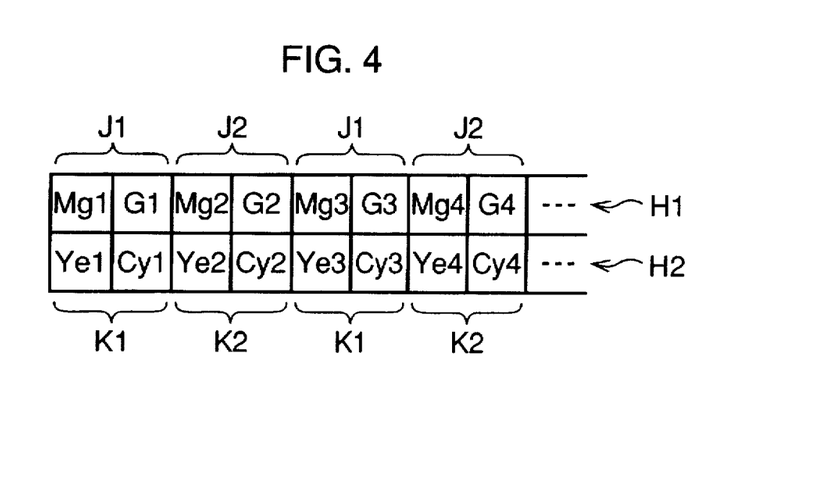
FIG. 4 is a diagram showing pixel signals outputted from the CCD in a two-line parallel reading mode.

FIG. 4 shows pixel signals outputted from the CCD 12 in the two-line parallel reading mode. Pixel signals Mg1 and Ye1 aligned in a vertical direction in the drawing are added to each other, and then outputted from the CCD 12. Similarly, pixel signals G1 and Cy1, aligned in a vertical direction, are added to each other and then outputted from the CCD 12. In a pair of Mg and G pixel signals, included in a first line H1, the signals positioned at odd numbered positions, as shown by reference J1, are read out from the CCD 12, and the signals positioned at even numbered positions, as shown by reference J2, are subsampled and are not read out from the CCD 12. Similarly, in a pair of Ye and Cy pixel signals included in a second line H2, the signals positioned at odd numbered positions, as shown by reference K1, are read out from the CCD 12, and the signals positioned at even numbered positions, as shown by reference K2, are subsampled and are not read out from the CCD 12.

Figure 5:
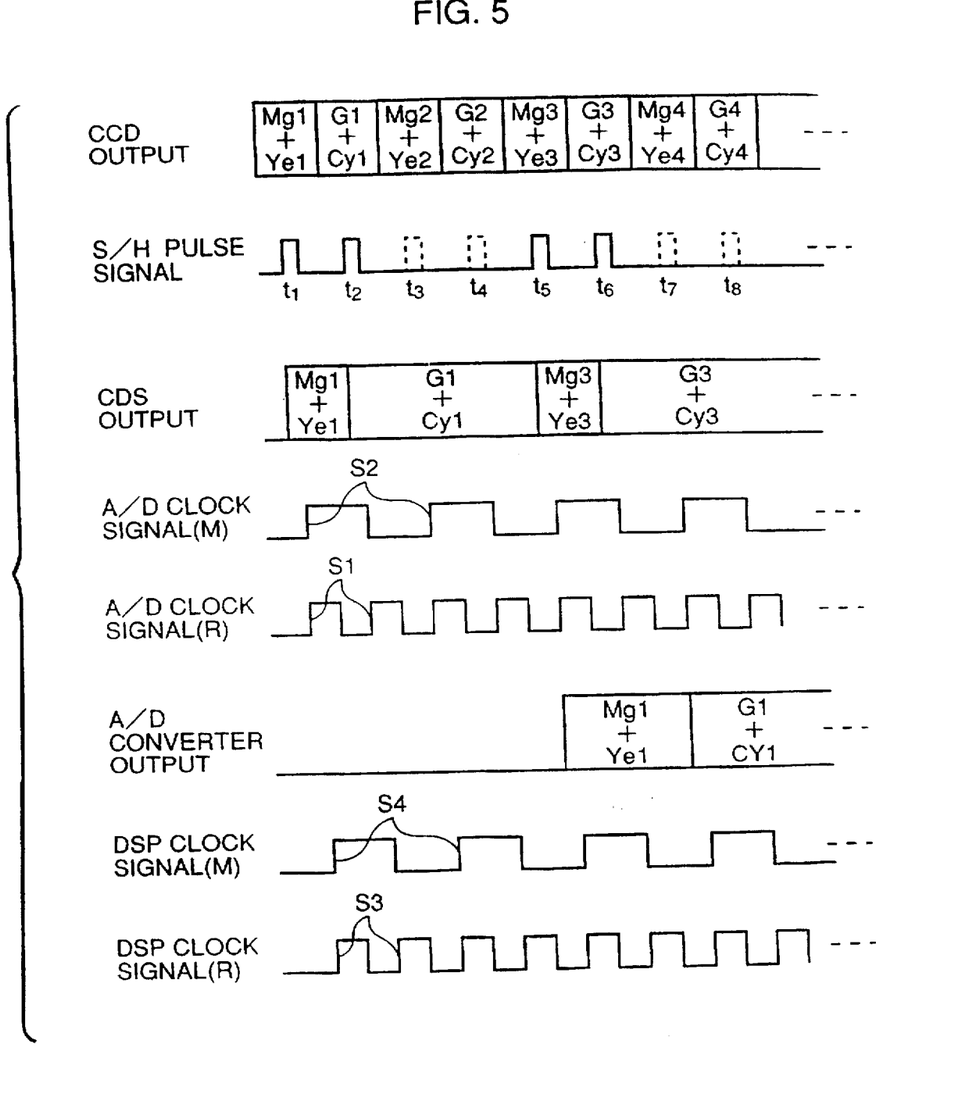
FIG. 5 is a timing chart showing each of the signals in the monitor-through mode and the record mode.

FIG. 5 is a timing chart showing each of signals in the monitor-through mode and the record mode.

A pixel signal Mg1 of the first line and a pixel signal Ye1 of the second line are added and outputted from the CCD 12 in synchronization with a clock signal outputted from the clock generating circuit 14. Then, a pixel signal G1 of the first line and a pixel signal Cy1 of the second line are added and outputted from the CCD 12. Similarly, a combined signal of Mg2 and Ye2, a combined signal of G2 and Cy2, a combined signal of Mg3 and Ye3, a combined signal of G3 and Cy3, etc., are outputted in turn.

In the pulse gate circuit 17, the S/H pulse signal is outputted at times $t_1$, $t_2$, $t_3$, $t_4$ . . . , i.e. at a constant interval, in synchronization with the pulse signal outputted from the clock generating circuit 14, while in the record mode. Conversely, in the monitor-through mode, the S/H pulse signals generated at times $t_3$, $t_4$, $t_7$, $t_8$ . . . are subsampled, and only the S/H pulse signals generated at times $t_1$, $t_2$, $t_5$, $t_6$ . . . are outputted.

In the CDS circuit 15, the pixel signals inputted from the CCD 12 are sampled in accordance with a rise of the S/H pulse signal, and are sample-held in accordance with a drop of the S/H pulse signal. Namely, in the monitor-through mode, the combined signal of Mg1 and Ye1 is sample-held between times $t_1$ and $t_2$, the combined signal of G1 and Cy1 is sample-held between times $t_2$ and $t_5$. The combined signal of Mg3 and Ye3 is sample-held between times $t_5$ and $t_6$, and the combined signal of G3 and Cy3 is sample-held between times $t_6$ and $t_9$.

The pixel signals such as Mg1 and Ye1 outputted by the CDS circuit 15 are A/D converted by the A/D converter 16 in synchronization with a rise of the A/D clock signal outputted by the divider 18. The A/D clock signal is raised immediately after time $t_1$, $t_2$, $t_3$, $t_4$ . . . as shown by reference S1 in the record mode, and is raised immediately after time $t_1$, $t_3$, $t_5$, $t_7$ . . . as shown by reference S2 in the monitor-through mode. Namely, the A/D clock signal is generated in accordance with the pulse signal outputted by the clock generating circuit 14 in the record mode, and has a frequency which is equal to half of that of the pulse signal of the clock generating circuit 14. According to the timing of the output of the A/D clock signal, the combined signal of Mg1 and Ye1, the combined signal of G1 and Cy1, the combined signal of Mg3 and Ye3, the combined signal of G3 and Cy3, etc., are A/D converted. Note that the combined signal of Mg1 and Ye1 is outputted from the A/D converter 16 after time $t_5$, and the combined signal of G1 and Cy1 is outputted from the A/D converter 16 after time $t_7$.

In the DSP circuit 21, processes, which include the complementary-color to primary-color conversion, are carried out in synchronization with the DSP clock signal outputted by the divider 18. The DSP clock signal is raised in accordance with the A/D clock signal S1, as shown by reference S3, in the record mode, and is raised in accordance with the A/D clock signal S2, as shown by reference S4, in the monitor-through mode. Namely, the output timing of the DSP clock signal corresponds to the A/D clock signal, and thus, the processes carried out in the DSP circuit 21 are performed in accordance with the A/D conversion for either the monitor-through mode or the record mode.

As described above, in this embodiment, in the record mode, all of the pixel signals outputted by the CCD 12 are read out therefrom through the CDS circuit 15. Then, after being subjected to a predetermined process in the DSP circuit 21 and the other circuits, all of the pixel signals are recorded in the memory card 23 as a still image. In the monitor-through mode, all of the pixel signals outputted by the CCD 12 are not read out therefrom through the CDS circuit 15. Namely, approximately half of the pixel signals are subsampled, and are not read through the CDS circuit 15, so that a number of pixel signals per one frame of a moving image in the monitor-through mode is less than that of a still image recorded in the memory card 23.

Therefore, in the monitor-through mode, a number of signal processes in the A/D converter 16 and the DSP circuit 21 is less than that of the record mode, so that the electric power consumption is reduced, and the life of a battery, which is the power source of the electric still camera, is prolonged.

It is supposed that the number of pixel signals per one frame in the CCD 12 is 410,000, that the pixel signals are read from the CCD 12 in the NTSC system, that the number of dots of one horizontal scanning line of the LCD 36 is 280, and that the dot arrangement is a so-called delta-arrangement of R, G and B. In this case, the horizontal resolution of the LCD 36 is $$\tfrac{3}{4} \cdot \tfrac{2}{3} \cdot 280 = 140$$

wherein $\tfrac{2}{3}$ is factored in to account for the delta-arrangement. The effective number (X) of pixels in the horizontal line of the CCD 12, necessary for obtaining the horizontal resolution of 140, is 187, according to the following formula (1):

$$T/(1/fx \cdot 2) \cdot \tfrac{3}{4} = X \cdot \tfrac{3}{4} = 140 \tag{1}$$

wherein "T" is a length of time of one horizontal scanning period which is 52.7 μsec , and "fx" is the sampling frequency which is 1.77 MHz. The effective number of pixels in the horizontal line of the CCD 12 is 768 which is approximately four times that of the LCD 36. Therefore, taking into consideration a signal deterioration which is caused by the signal processing system such as the DSP circuit 21, even if the pixel signals outputted from the CCD 12 are subsampled by up to one third thereof, the image quality of the image indicated by the LCD 36 is approximately the same as the image when the pixel signals obtained through the CCD 12 are not subsampled.

As described above, the subsampling of the pixel signals is carried out, through an operation of the pulse gate circuit 17, i.e. a control of the gate interval of the pulse gate circuit 17, so that the timing of the A/D conversion in the A/D converter 16 and the signal processing in the DSP circuit 21 are in synchronization with the output timing of the CDS circuit 15. Namely, the gate interval of the pulse gate circuit 17 and the number of the division in the divider 18 are controlled in such a manner that a bandwidth of a spatial frequency of an image formed by the pixel signals outputted by the CCD 12 is not lower than a bandwidth of a spatial frequency of an image which can be indicated by the LCD 36.

Figure 6:
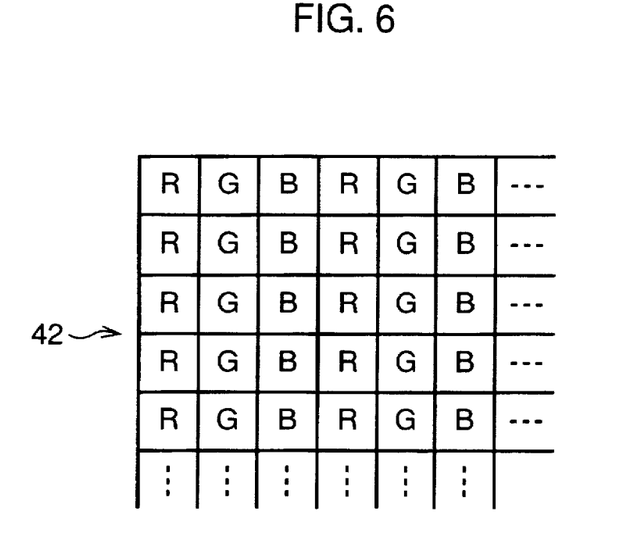
FIG. 6 is a view showing an arrangement of each of the color filter elements provided on a light receiving surface of a CCD in a second embodiment.
Figure 7:
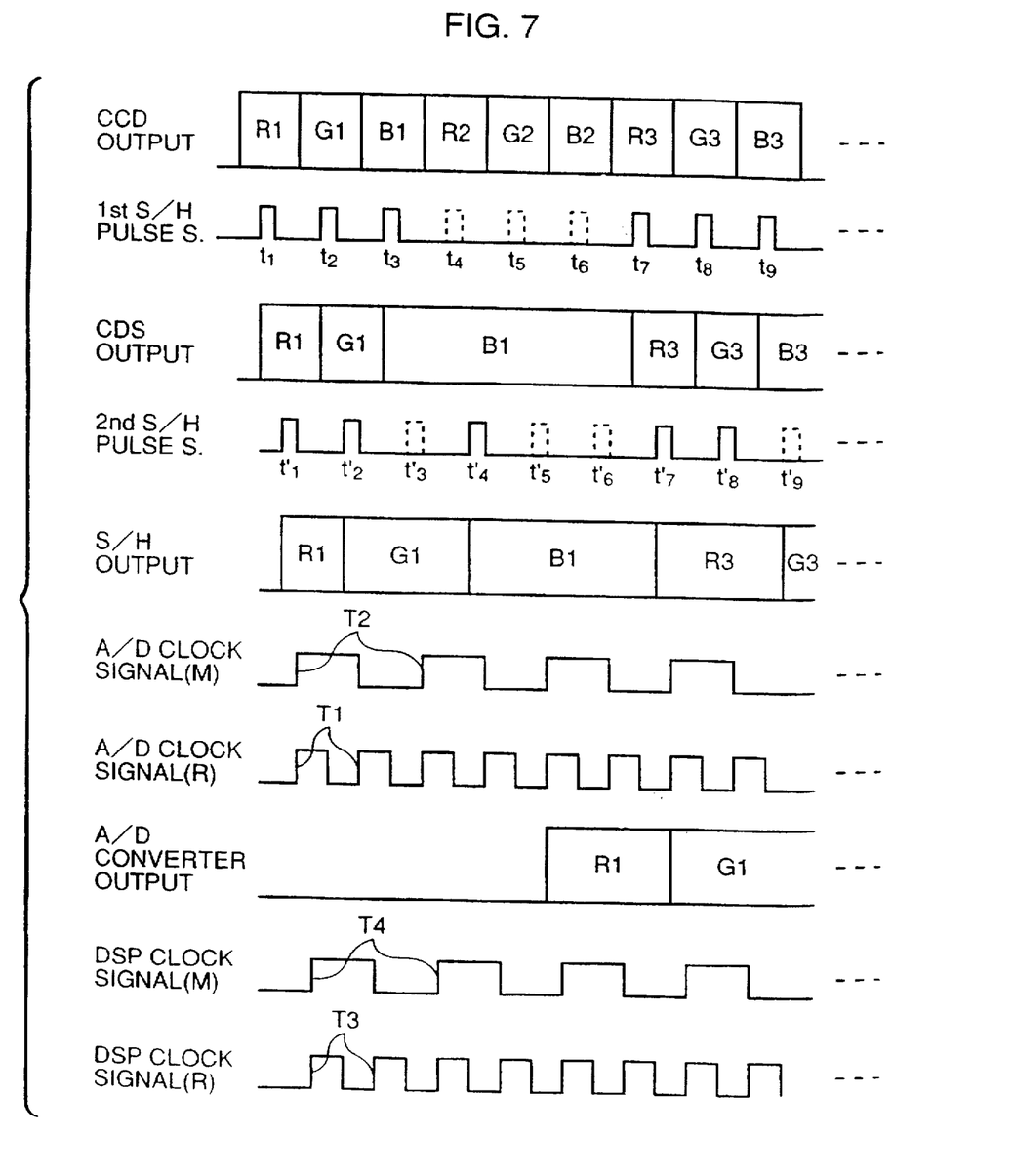
FIG. 7 is a timing chart showing each of the signals in the monitor-through mode and the record mode in a second embodiment.

With reference to FIGS. 6 and 7, a second embodiment of the present invention will be described below.

In the second embodiment, the color filter 42 provided on the light receiving surface of the CCD 12 has color filter elements which are arranged as shown in FIG. 6. This color filter 42 is a so-called stripe type, in which red (R), green (G) and blue (B) filter elements are arranged in this turn. FIG. 6 shows that for each of R, G and B filter elements, an identical filter element is disposed on the lower side thereof, respectively. Namely, a row of the R filter elements, a row of the G filter elements and a row of the B filter elements are provided in turn.

FIG. 7 is a timing chart showing each of the signals in the monitor-through mode and the record mode.

The CCD 12 has a construction in which pixel signals are outputted therefrom line by line. Namely, R, G and B pixel signals are alternately outputted from the CCD 12. These signals are named R1, G1, B1, R2, G2, B2, R3, G3, and B3 . . . etc.

The S/H pulse signal is outputted through the pulse gate circuit 17 at times $t_1, t_2, t_3, t_4 \ldots$ i.e. at a constant interval, in synchronization with the pulse signal outputted from the clock generating circuit 14, in the record mode. Conversely, in the monitor-through mode, the S/H pulse signal generated at times $t_1, t_2, t_3, t_7, t_8, t_9 \ldots$ is outputted. Namely, the S/H pulse signal is subsampled at time $t_4, t_5, t_6 \ldots$.

In the monitor-through mode, the pixel signals R1, G1 and B1 are sample-held by the CDS circuit 15 between times $t_1$ and $t_2$, times $t_2$ and $t_3$, and times $t_3$ and $t_7$, respectively, and are outputted. Similarly, the pixel signals R3, G3 and B3 are sample-held between times $t_7$ and $t_8$, times $t_8$ and $t_9$, and times $t_9$ and $t_{10}$, respectively, and are outputted.

In the CDS circuit 15, another sample hold circuit is provided, in which the sample-hold is performed based on a second S/H pulse signal outputted by the pulse gate circuit 17. The second S/H pulse signal is outputted at times $t'_1, t'_2, t'_3, t'_4 \ldots$ in the record mode, and is outputted at times $t'_1, t'_2, t'_4, t'_7, t'_8 \ldots$ in the monitor-through mode. Namely, in the monitor-through mode, the second S/H signal is subsampled at times $t'_3, t'_5, t'_6, t'9 \ldots$. Note that the second S/H pulse signal is raised in synchronization with a drop of the first S/H pulse signals which are outputted at times $t_1, t_2, t_3, t_4, t_5, t_6 \ldots$ The pixel signals R1, G1, B1, R3, G3 and B3, sample-held in the CDS circuit 15 in accordance with the first S/H pulse signal, are sample-held in the sample-hold circuit, and in the monitor-through mode, the pixel signals R1, G1 and B1 are outputted from the CDS circuit 15 between times $t'_1$ and $t'_2$, times $t'_2$ and $t'_4$, and times $t'_4$ and $t'_7$, respectively.

The pixel signals, such as R1, G1 and B1 outputted by the CDS circuit 15, are A/D converted by the A/D converter 16 in synchronization with a rise of the A/D clock signal outputted by the divider 18. The A/D clock signal is raised immediately after times $t'_1, t'_2, t'_3, t'_4 \ldots$, as shown by reference T1, in the record mode, and is raised immediately after times $t'_1, t'_3, t'_5, t'_7 \ldots$, as shown by reference T2, in the monitor-through mode. Namely, the A/D clock signal is generated in accordance with the pulse signal outputted by the clock generating circuit 14 in the record mode, and has a frequency which is equal to half of that of the pulse signal of the clock generating circuit 14. According to the timing of the output of the A/D clock signal, the pixel signals R1, G1 and B1 are A/D converted.

In the DSP circuit 21, processes including the white balance and the edge-sharpening, are carried out in synchronization with the DSP clock signal outputted by the divider 18. The DSP clock signal is raised in accordance with the A/D clock signals T1 and T2 as shown by references T3 and T4, respectively. Namely, the output timing of the DSP clock signal corresponds to the A/D clock signal, and thus, the process in the DSP circuit 21 is performed in accordance with the A/D conversion for either the monitor-through mode or the record mode.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-266209 (filed on Sep. 21, 1995) which is expressly incorporated herein by reference, in its entirety.

I claim:

1. A control device that controls a number of pixels, said control device being provided in an electronic still camera having an imaging device that outputs real-time pixel signals and a display device that indicates a moving image corresponding to said pixel signals outputted in real-time from said imaging device, in which a still image is included said moving image, said control device comprising:

a control circuit by which a number of pixels in one frame of each of said still image and said moving image is controlled in such a manner that said number of pixels of one frame of said moving image is less than said number of pixels of said still image, said control circuit comprising:

a clock generating circuit that generates a first clock signal having a constant period;

a pulse gate circuit processes said pixel signals outputted from said imaging device by passing only a portion of said first clock signal, said pulse gate circuit sample-holding a part of said pixels signals output from said imaging device and A/D converting said part, based on first pulse signals, a number of said first pulse signals being less than that of second pulse signals generated by said clock generating circuit; and a controller that controls a gate interval of said pulse gate circuit in such a manner that a bandwidth of a spatial frequency of an image formed by said pixel signals output by said imaging device is not lower than a bandwidth of a spatial frequency of an image which can be indicated by said display device.

2. A control device that controls a number of pixels, said control device being provided in an electronic still camera having an imaging device that outputs real-time pixel signals and a display device that indicates a moving image corresponding to said pixel signals outputted in real-time from said imaging device, in which a still image is included in said moving image, said control device comprising:

a control circuit by which a number of pixels in one frame of each of said still image and said moving image is controlled in such a manner that said number of pixels of one frame of said moving image is less than a number of pixels of said still image, said control circuit comprising:

a clock generating circuit that generates a first clock signal having a constant period;

a divider that processes said pixel signals outputted from said imaging device by generating a second clock signal having a frequency that is lower than a frequency of said first clock signal, said divider sample-holding a part of said pixels signals output from said imaging device and A/D converting said part based on first pulse signals, a number of which is less than that of second pulse signals generated by said clock generating circuit; and a controller that controls a dividing number of said divider in such a manner that a bandwidth of a spatial frequency of an image formed by said pixel signals output by said imaging device is not lower than a bandwidth of a spatial frequency of an image which can be indicated by said display device.

3. A device for controlling a number of pixels of a still image recorded in a recording medium and a moving image indicated by a display device, respectively, said still image being included in said moving image, said device comprising:

means for outputting a pulse signal, in which pixel signals corresponding to said still image and said moving image are transmitted in synchronization with the recording medium and the display device, respectively; and means for controlling said outputting means in such a manner that a number of pixels included in one frame of said moving image is less than a number of pixels of said still image, such that a bandwidth of a spatial frequency of an image formed by said pixel signals is not lower than a bandwidth of a spatial frequency of an image which can be indicated by said display device.

4. A monitor control device provided in an electronic still camera, in which pixel signals outputted from an imaging device can be recorded to a recording medium as a still image, said device comprising:

means for indicating said pixel signals on a display in a monitor-through mode, in which a moving image is indicated; and means for controlling a number of pixels in one frame of each of said still image and said moving image, said controlling means reducing said number of pixels in said monitor-through mode in comparison with a number of pixels in a mode in which said pixel signals are recorded to the recording medium, such that a bandwidth of a spatial frequency of an image formed by said pixel signals output by said imaging device is not lower than a bandwidth of a spatial frequency of an image which can be indicated by said display device.

5. A monitor control device according to claim 4, wherein said indicating means comprises a liquid crystal display, a number of dots indicated by said liquid crystal display being set such that a spatial frequency of an image which can be indicated by said liquid crystal display is lower than a highest spatial frequency of an image which can be obtained by said imaging device.

* * * * *

UNITED STATES PATENT AND TRADEMARK OFFICE
CERTIFICATE OF CORRECTION

PATENT NO. : 5,793,923
DATED : August 11, 1998
INVENTOR(S) : K. SAWANOBORI

It is certified that error appears in the above-identified patent and that said Letters Patent is hereby corrected as shown below:

At column 8, line 3 (claim 1, line 6)
"included said" should be —included in said—.

At column 8, line 13 (claim 1, line 16)
"circuit processes" should be —circuit that processes—.

Signed and Sealed this

Fourteenth Day of December, 1999

Attest:

Q. TODD DICKINSON

Attesting Officer                 Acting Commissioner of Patents and Trademarks